United States Patent [19]
Lauwers

[11] Patent Number: 5,139,558
[45] Date of Patent: Aug. 18, 1992

[54] ROOF-MOUNTED AUXILIARY OXYGEN-FIRED BURNER IN GLASS MELTING FURNACE

[75] Inventor: Eddy J. Lauwers, Kalmthout, Belgium

[73] Assignee: Union Carbide Industrial Gases Technology Corporation, Danbury, Conn.

[21] Appl. No.: 795,124

[22] Filed: Nov. 20, 1991

[51] Int. Cl.⁵ .............................................. C03B 5/18
[52] U.S. Cl. ...................................... 65/135; 65/136; 65/346; 65/347
[58] Field of Search ................. 65/134, 135, 136, 346, 65/347

[56] References Cited

U.S. PATENT DOCUMENTS

| | | | |
|---|---|---|---|
| 3,592,623 | 7/1971 | Shepard | 65/136 |
| 4,062,667 | 12/1977 | Hatanaka et al. | 65/135 |
| 4,473,388 | 9/1984 | Lauwers | 65/134 |
| 4,541,796 | 9/1985 | Anderson | 431/187 |
| 4,599,100 | 7/1986 | Demarest, Jr. | 65/134 |
| 4,604,123 | 8/1986 | Desprez et al. | 65/134 |
| 4,816,056 | 3/1989 | Tsai et al. | 65/135 |

FOREIGN PATENT DOCUMENTS

82/04246 12/1981 World Int. Prop. O. ............ 65/136

OTHER PUBLICATIONS

Oxygen Enrichment in Glass Melting Furnaces Glass Jun. 1975 p. 187.
U.S. Pat. application Ser. No. 07/684,028, to Lauwers, filed on Apr. 11, 1991.

*Primary Examiner*—Robert L. Lindsay
*Attorney, Agent, or Firm*—Chung K. Pak

[57] ABSTRACT

The invention relates to a process for melting solid glass forming ingredients in a regenerative of recuperative furnace having an upstream melting zone and a downstream fining zone comprising:
a) introducing said solid glass forming ingredients into said upstream melting zone;
b) heating said solid glass forming ingredients so that an interface of solid glass forming ingredients and molten glass is formed;
c) providing heat sufficient to maintain the molten glass in the molten state through said downstream fining zone and sufficient to melt said solid glass forming ingredients, wherein at least a part of said heat is provided by at least one flame from at least one oxygen-fuel burner located on the roof of said furnace, the position of said at least one oxygen-fuel burner on the roof being such that the tip of its flame is directed approximately at the interface of said solid glass forming ingredients and said molten glass in an angle ranging from about 25° to about 90° whereby the melting rate for said solid glass forming ingredients is increased and, at the same time, said solid glass forming ingredients are substantially prevented from escaping the upstream melting zone.

11 Claims, 1 Drawing Sheet

ROOF-MOUNTED AUXILIARY OXYGEN-FIRED BURNER IN GLASS MELTING FURNACE

TECHNICAL FIELD

The invention relates to the employment of at least one auxiliary oxygen-fired burner on the roof of a furnace, more particularly on the roof of a cross-fired regenerative furnace, in a particular manner to improve the melting rate of glass forming ingredients and the quality of glass products.

BACKGROUND OF THE INVENTION

Regenerative or recuperative furnaces having melting and fining zones have been commonly employed to manufacture glass. The regenerative or recuperative furnaces, unlike other types of furnaces, employ at least one regenerator or recuperator in operating air-fuel burners. At least one regenerator or recuperator, which may come in many different shapes and sizes, serves to preheat air used in the air-fuel burners. In the regenerator the preheating is generally accomplished by transferring the heat in the existing waste gas from a melting chamber to refractory bricks stacked in a checkerboard fashion. The bricks, in turn, give up their heat to the incoming air which will be used in combusting the fuel. Commonly, the recuperator may consist generally of a double wall tubing in which the off gas from the melting chamber flows in the central tube countercurrent to the air which is passing through the annulus. The performance of the regenerator or recuperator, however, may deteriorate with time because the regenerator or recuperator may be partially plugged or destroyed when it is subject to the waste gas containing chemical contaminants for a long period. The partially plugged or destroyed regenerator or recuperator adversely affects the performance of air-fuel burners, thereby decreasing the glass production rate.

It has been known, therefore, to employ oxygen-fuel burners, in a number of furnaces to supplement the air-fuel burners. U.S. Pat. No. 4,473,388 (Lauwers) issued Sep. 25, 1984 and International Publication WO 82/04246 (Erickson et al) published Dec. 9, 1982, for instance, disclose oxygen-fuel burners installed on the sides of a rectangular glass melting chamber in a particular manner to increase the melting capacity of a furnace. Some unmelted solid glass forming ingredients, however, may be discharged with the molten glass. The presence of unmelted glass forming ingredients in the molten glass product adversely affects the quality of glass products. To enhance the quality of the glass products these unmelted solid glass ingredients need to be prevented from being discharged by employing additional oxygen-fuel auxiliary burners in a manner described in U.S. Pat. Nos. 4,816,056 (Tsai et al) or 3,592,623 (Shepard). The use of the additional oxygen-fuel auxiliary burners, however, may increase the oxygen and fuel consumption and the risk of overheating the roof of a furnace. Moreover, installing a plurality of the oxygen fuel auxiliary burners in a manner described by the above references may be difficult whenever a cross-fired regenerative furnace is utilized due to the location and design of its regenerators.

Accordingly, it is an object of the invention to increase the melting capacity of a regenerative or recuperative furnace and, at the same time, reduce the possibility of unmelted solid glass forming ingredients from discharging with the molten glass, without increasing the risk of overheating the roof of the furnace and without increasing the oxygen and fuel consumption.

It is another object of the invention to maintain a particular glass production rate even when the regenerators are partially plugged or destroyed or are being repaired.

It is yet another object of the invention to install oxygen-fuel auxiliary burners in such a manner to accommodate the restraints imposed by regenerators of a cross-fired or side-fired regenerative furnace.

It is further object of the invention to inhibit the formation of NOx during the glass melting.

SUMMARY OF THE INVENTION

According to the present invention, the above and other objects which will become apparent to those skilled in the art are attained by:

A process for melting solid glass forming ingredients in a regenerative or recuperative furnace having an upstream melting zone and a downstream fining zone comprising:

(a) introducing said solid glass forming ingredients into said upstream melting zone;

(b) heating said solid glass forming ingredients so that an interface of solid glass forming ingredients and molten glass is formed; and (c) providing heat sufficient to maintain the molten glass in the molten state through said downstream fining zone and sufficient to melt said solid glass forming ingredients, wherein at least a part of said heat is provided by at least one flame from at least one oxygen-fuel burner located on the roof of said furnace, the tip of said at least one flame from said at least one oxygen-fuel burner on the roof being directed approximately at the interface of said solid glass forming ingredients and said molten glass in an angle ranging from about 25° to about 90°, thus increasing the melting capacity of said furnace while simultaneously inhibiting said solid glass forming ingredients from exiting with said molten glass.

As used herein, the term "at least one oxygen-fuel burner" means one or more oxygen fuel burners.

DETAILED DESCRIPTION OF THE INVENTION

The present invention involves a discovery that the installation of at least one oxygen-fuel auxiliary burner in a particular manner on the roof of a regenerative or recuperative furnace can increase the melting rate of solid glass forming ingredients and, at the same time, can inhibit the egress of the solid glass forming ingredients from the furnace with the molten glass. By achieving these synergetic effects simultaneously with at least one particularly arranged oxygen-fuel burner, the fuel and oxygen consumption may be reduced while improving the glass production rate and the quality of glass products. Moreover, the downwardly fired flame of at least one oxygen-fuel burner directs heat flow toward the glass forming ingredients and the molten glass surface, thus reducing the risk of overheating the roof of the furnace.

Figure 1:
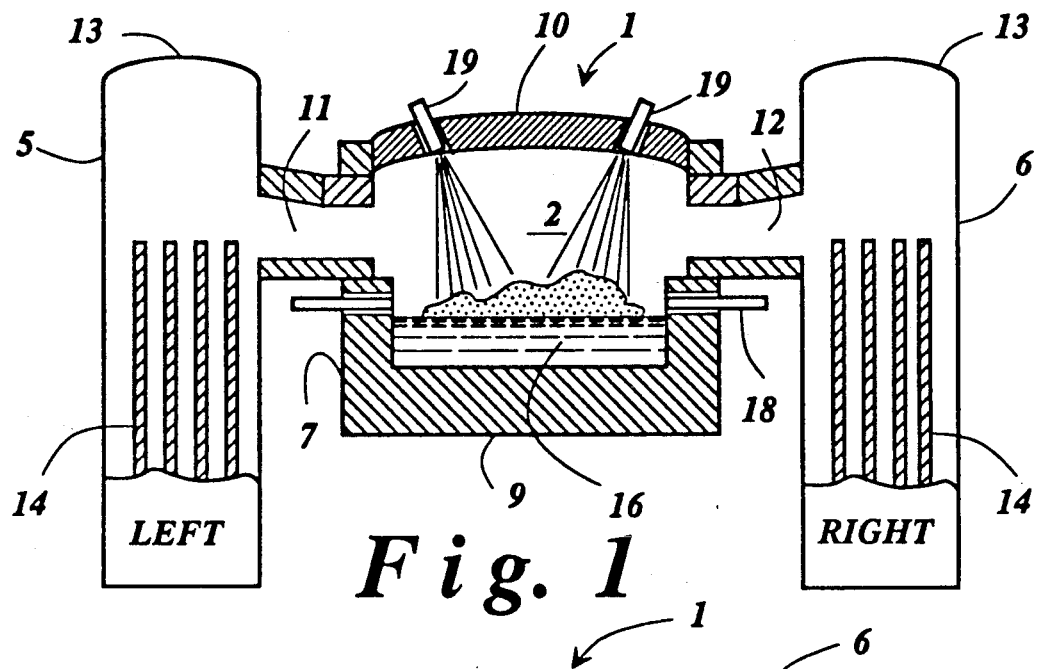
FIGS. 1, 2 and 3 represent front, top and side views of a cross-fired regenerative furnace.
Figure 2:
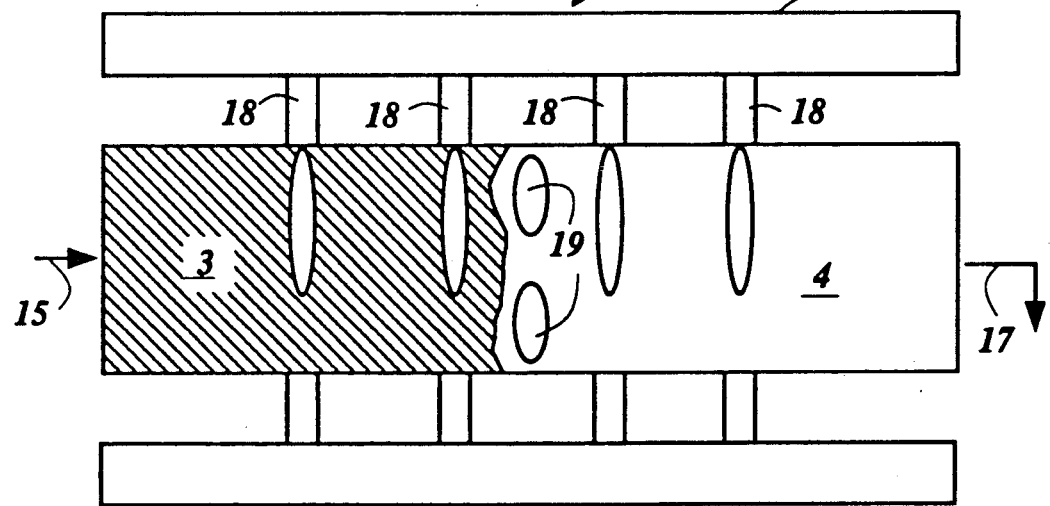
Figure 3:
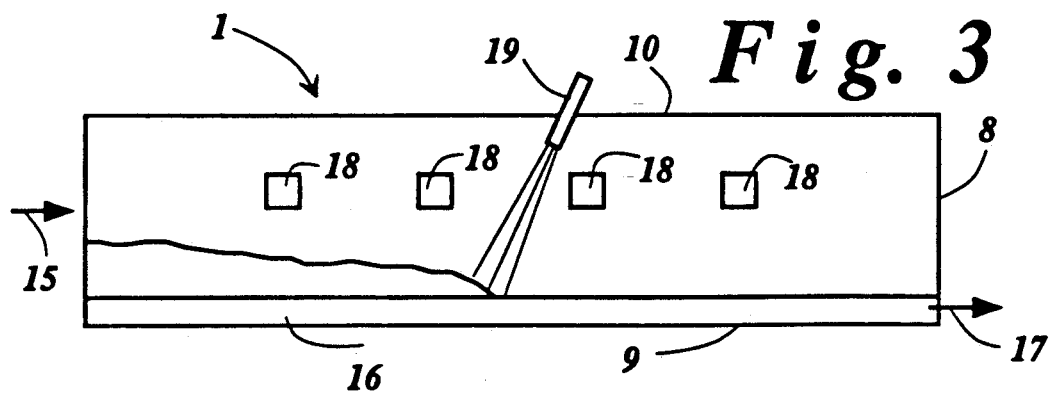

FIGS. 1, 2 and 3 illustrate a preferred embodiment of the present invention wherein the glass melting is carried out in a cross-fired regenerative furnace. The furnace (1) comprises an elongated chamber (2) having a melting zone (3) and a fining zone (4), which is flanked by at least a pair of regenerators (5 and 6). The elongated chamber (2), which may be defined by side walls (7), a front wall (8), a bottom (9) and a roof (10), is in communication with the regenerators (5 and 6) via a plurality of air ports (11 and 12). The regenerators generally include a housing means (13) containing refractory materials (14) stacked in an checkerboard fashion that permits the alternate passage of air and exhaust gas. Due to the high temperatures involved in melting and refining glass, a suitable refractory material is generally used to build the structures of the furnace (1). The suitable refractory material includes, inter alia, alumina, chrome-magnesite, magnesia and silica.

Glass forming ingredients are introduced to the melting zone (3) of the chamber (2) through inlet means (15). The glass forming ingredients form a layer of solid particles on the surface of the molten glass (16) in the melting zone (3). The layer of solid particles proceeds to melt gradually as it travels from the melting zone (3) to the fining zone (4). The solid particles float on the surface of the molten glass toward the front wall (8) where outlet means (17) is located.

The glass forming ingredients are a mixture of high temperature melting raw materials use in the manufacture of glass. The mixture make-up is dependent on the type of glass being produced. Normally, the mixture comprises, inter alia, silica containing materials including scrap glass referred to as cullet. Other glass forming materials including feldspar, limestone, dolomite, soda ash, potash, borax and alumina may also be used. To alter the properties of the glass, a minor amount of arsenic, antimony, sulfates and/or fluorides needs to be added. Moreover, color forming metal oxides can be added to obtain the desired color.

The heat necessary to melt the glass forming ingredients and to maintain the molten glass at a desired temperatures maybe primarily provided by air-fuel burners (18). The air-fuel burners (18) operate to provide heat when fuel, such as oil, natural gas or LPG, introduced through at least one fuel lance is combusted in the presence of preheated air. The source of this preheated air is altered based on the combustion cycle involved. During an initial combustion cycle, for example, air passes from the left regenerator (5) through a plurality of ports (11) and enters into the elongated chamber (2) while the combustion products (gases) are removed through a plurality of ports (12) into the right regenerator (6) where heat is recovered from the combustion products via the refractory checker (14) located in the regenerator (6). In the next combustion cycle, the operation is reversed, with air passing from the right regenerator (6) through a plurality of the ports (12) into the chamber (2) and with the combustion product exhausting through a plurality of ports (11) into the left regenerator (5) where heat is recovered by means of the refractory checkers (14) located in the regenerator (5). The air is preheated as it passes through heated refractory checkers (14). The flow of air (the direction of combustion) is periodically reversed, example, each 30 minutes, in the above manner by using, for example, valves (not shown).

At least one auxiliary oxygen-fuel burner (19) is also utilized not only to provide at least a part of the heat necessary to melt the solid glass forming ingredients and maintain molten glass in the molten state but also to inhibit the unmelted glass forming ingredients from entering the outlet means (17). If the formation of NOx needs to be inhibited, the oxygen-fuel burner disclosed and claimed in U.S. Pat. No. 4,541,796-Anderson, may be utilized. This oxygen-fuel burner is preferably mounted on a side portion of the roof near or above where an interface of the solid particulate layer and the molten glass is formed. The term "a side portion of the roof" refers to an area in the vicinity of or on the edge of the roof near each side wall. Although the area referred to may vary based on the width of a furnace, it usually covers up to about 3 meters, preferably up to 2 meters, from the edge of the roof to the central axis of the width of the furnace. This portion of the roof is found to provide, inter alia, a proper angle for at least one oxygen-fuel burner to efficiently heat the interface of the solid particulate layer and the molten glass and to substantially prevent the egress of the solid particulate layer from the melting chamber. The flame of the properly angled oxygen-fuel burner is generally directed downward between air-fuel burners' flames in a substantially parallel manner such that it is substantially inhibited from intermingling with the air burners' flames and/or disturbing the air-burners flames. The avoidance of these disturbance and intermingling promotes efficient heating of the interface and effective prevention of the egress of the solid particulate from the melting chamber. To maintain the avoidance of the stated intermingling or disturbance, the flame velocity of at least one oxygen-fuel burner needs to be regulated to provide a stable flame which can be used to strike the interface at a particular angle. Generally, the flame velocity employed is dependent on the distance between at least one nozzle tip of at least one oxygen-fuel burner and the interface. In conventional cross-fired regenerative furnaces, the flame velocity employed may be at least about 50 meters per second, preferably at least about 120 meters per second. It should be sufficient to create or provide a flame length of about 1 meter to about 3 meters, more preferably about 2 meters to 2.6 meters. The position of the oxygen-fuel burner on the roof must be such that the tip of its flame is directed at the interface of the solid particulate layer and the molten glass in an angle ranging from about 25° to about 90°; preferably from about 40° to about 60°. It will be understood that the flame tip does not have to be precisely on the interface and can vary from the interface by as much as several meters. The closer the flame tip is to the interface the better, however, in increasing the glass melting rate since the interface of the solid particulate layer and the molten glass is an area where heat can be efficiently transferred to the solid particulate layer.

Oxygen fuel burners, more commonly referred to as oxy-fuel burners, are well known. They are designed to use a higher percentage of oxygen than is present in air and thus provide much higher flame temperatures. The temperature of the flame imparted by the oxygen-fuel auxiliary burner is dependent on the quality of the fuel and the oxygen/fuel ratio. Generally, this temperature of the oxygen flame is about 2780° C., which is substantially higher than the temperature of a conventional air-fuel burner which is about 1950° C. Generally, the oxygen concentration is at a level of about 50 percent to 100 percent by volume. It will be understood, however, that the present oxygen-fuel burner contemplates the use of a mixture containing more than 21% oxygen and other gases such as nitrogen or argon.

A preferred oxygen-fuel auxiliary burner for use in the process is an assembly of three concentric cylinders:

(i) The outer cylinder is a jacket, through which any cooling medium flows for protection of the burner from being overheated by the furnace atmosphere;

(ii) the middle cylinder is an oxygen or oxygen containing gas supply line; and (iii) the inner or center cylinder is a supply line for a gaseous or liquid fuel.

The burner assembly is of sufficient length to protrude through the furnace roof or may be contained in a burner block mounted on the furnace roof so that the burner parts are not affected by the furnace atmosphere. Connections are foreseen for several fluids passing through the burner, i.e., the water for the waterjacket, the gaseous or liquid fuel, and the oxygen containing gas.

There is a frontplate, which covers the end of the burner assembly. It has one large cylindrical orifice in the center, which orifice permits gaseous or liquid fuel to flow from the center cylinder, surrounded by a number of small cylindrical orifices equidistant from each other and from the axis (running from end to end) of the center cylinder. These orifices open into the middle cylinder. Each of the axes (again, running from end to end of the cylinder) of these smaller cylindrical orifices is slanted at an angle from the axis of the center cylinder so that the oxygen containing gas passes downward from the middle cylinder in the direction of the axis of the center cylinder to meet the fuel proceeding parallel to the axis of the center cylinder. The overall burner assembly is about 1 meter in length and the diameter of the outer cylinder is about 110 millimeter. The thickness of the frontplate is about 12 millimeter, the large orifice is about 20 millimeter in diameter, and the smaller orifices are about 8 millimeter in diameter.

The orifices in the frontplate of the burner create a homogeneous mixture of fuel and oxygen, thus obtaining a high temperature flame. By varying the diameter and length of the frontplate orifices and the angle of the axes of the smaller orifices to that of the axis of the large center orifice different flame lengths, accommodating different furnace dimensions, are obtained. Further, the frontplate permits the fuel to burn with more or less oxygen than required for complete combustion. Consequently, if it is desired for reasons of glass quality, a reducing or oxidizing flow may be obtained without affecting the shape of the flame.

The following example serves to further illustrate the invention. It is presented for illustrative purposes and it is not intended to be limiting.

EXAMPLE

A cross-fired regenerative furnace having a capability to produce 340 TPD of glass bottles was utilized. The furnace has a melting chamber which is defined by a width of about 6100 mm, a length of about 11666 mm and a height of about 2180 mm (from the molten glass surface to the roof or crown). The melting chamber was in communication with two regenerators (checker type) via four air ports one each side wall as shown in FIGS. 1, 2 and 3. To this furnace, two oxygen-fuel burners were installed. Each oxygen-fuel burner was located on the edge of the roof near each vertical side wall between the third and fourth air ports counting from the entrance means for the solid glass forming ingredients. The position of each oxygen-fuel burner is such that the tip of its flame is directed approximately at the interface of the solid glass forming ingredients and molten glass in an angle of 47° (angle between the flame axis and horizontal molten glass surface). The flame from each oxygen-fuel burner, which was operated to follow the firing sequence of the air-fuel burner, minimized the disturbance of the flames of air-fuel burners, since the flame from each oxygen-fuel burner was placed or directed between the flames the air-fuel burners. The flame velocity of each oxygen-fuel burner was regulated to provide a stable flame length of about 2300 mm as measured from the oxygen-fuel burner to the impact point of the flame tip at the molten glass surface. The flame velocity (the gas and oxygen outlet velocity) employed was bout 140 m/sec. The glass production capability was increased from 340 TPD to about 380 TPD without promoting or increasing the formation of NOx. The glass forming ingredients were also inhibited from leaving or escaping the melting chamber with the molten glass.

The oxygen-fuel burners installed in an appropriate manner is a recuperative or regenerativefurnace proved to be innovative and surprisingly useful in increasing the glass production rate without increasing the roof temperature. Moreover, such installation provided flexibility to a glass manufacturing process by being able to operate the furnace even when its regenerators are not functioning properly.

Although the invention has been described in detail with reference to certain specific embodiments, those skilled inn the art will recognize that there are other embodiments within the spirit and scope of the claims.

What is claimed is:

1. A process for melting solid glass forming ingredients in a regenerative or recuperative furnace having a roof, an upstream melting zone and a downstream fining zone comprising:
   a) introducing said solid glass forming ingredients into said upstream melting zone;
   b) heating said solid glass forming ingredients so that an interface of solid glass forming ingredients and molten glass is formed; and
   c) providing heat sufficient to maintain the molten glass in the molten state through said downstream fining zone and sufficient to melt said solid glass forming ingredients, wherein at least a part of said heat is provided by at least one flame from at least one oxygen-fuel burner located on the roof of said furnace, the position of said at least one oxygen-fuel burner on the roof being such that the tip of its flame is directed approximately at the interface of said solid glass forming ingredients and said molten glass in an angle within the range of from about 25° to about 90° whereby the melting rate for said solid glass forming ingredients is increased and, at the same time, said solid glass forming ingredients are substantially prevented from escaping the upstream melting zone.

2. A process according to claim 1, wherein the position of said at least one oxygen-fuel burner on the roof is such that the tip of its flame is directed approximately at the interface of said solid glass forming ingredients and said molten glass in an angle within the range of about 40° to about 60°.

3. A process according to claim 1, wherein the tip of said at least one flame from at least one oxygen-fuel burner is directed to said interface of said solid glass forming ingredients and said molten glass at a velocity of at least 50 meters per second.

4. A process accordingly to claim 3, wherein the velocity of said at least one flame is sufficient to provide a flame length of about 1 meter to about 3 meters.

5. A process according to claim 4, wherein the velocity of said at least one flame is sufficient to provide a flame length of about 2 meters to about 2.6 meters.

6. A process accordingly to claim 3, wherein the velocity of said at least one flame is at least about 120 meter per second.

7. A process according to claim 1, wherein said at least one oxygen-fuel burner comprises a plurality of oxygen-fuel burners.

8. A process according to claim 1, wherein at least a part of said heat is provided by the flames from air-fuel burners.

9. A process according to claim 8, wherein the flame of said at least one oxygen-fuel burner is directed downward between the flames of said air-fuel burners so that the disturbance of the air-fuel burners flames is minimized.

10. A process according to claim 9, wherein said furnace is a side fired or cross-fired regenerative furnace.

11. A process according to claim 10, wherein said at least one oxygen-fuel burner is located on a side portion of the roof near or above the interface of said glass forming ingredients and said molten glass.

* * * * *